Nov. 3, 1953  J. L. PETTUS  2,657,871
FILM REEL DRIVE MECHANISM
Filed Oct. 31, 1950

INVENTOR.
James L. Pettus
BY
ATTORNEY.

Patented Nov. 3, 1953

2,657,871

UNITED STATES PATENT OFFICE 2,657,871

FILM REEL DRIVE MECHANISM

James L. Pettus, Encino, Calif., assignor to Radio Corporation of America, a corporation of Delaware Application October 31, 1950, Serial No. 193,110

4 Claims. (Cl. 242—55)

This invention relates to film drive mechanisms, and particularly to a film reel drive whereby the power for winding film on one reel is derived from the unwinding film of a supply reel.

Many types of film magazine reel drives are known, most of which obtain their power either directly from the main film advancing mechanism through belts, pulleys, sprockets, and chains, or by direct motor drives. The power is generally applied through slippage clutches to the takeup reel hubs on which the film is wound.

The present invention is directed to a takeup film winding mechanism which drives the reel by contact with the last turn of the film roll, and which is suitable for film rolls up to the largest size, such as a five (5) thousand foot roll. The power for the roller driving the takeup roll or reel is derived from the film's leaving the supply roll or reel, the power being transferred in a slightly greater ratio than one to one to compensate for friction, slippage, and other similar losses between the drive roller and the driven roller.

The principal object of the invention, therefore, is to facilitate the winding of film in rolls of any size.

A further object of the invention is to provide an improved driving mechanism for a film take-up reel which is independent of the main film advancing mechanism and without utilizing auxiliary motors.

A still further object of the invention is to provide an improved transfer drive mechanism between a supply reel and a takeup reel which automatically adjusts itself for varying sizes of the film rolls.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
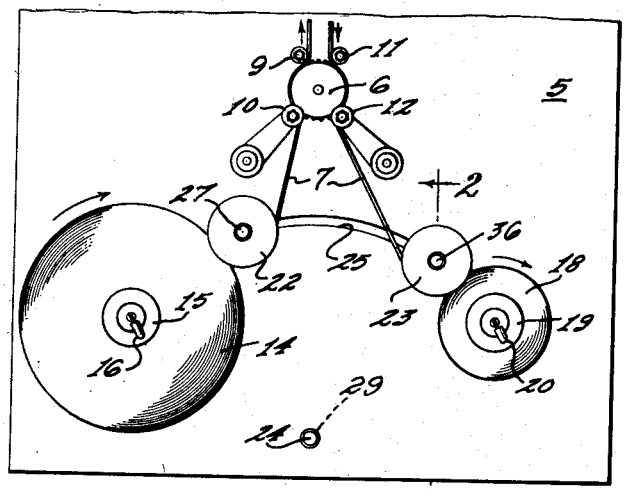
Fig. 1 is a front, elevational view of the drive mechanism embodying the invention.

Referring now to the drawings, in which the same numerals identify like elements, a panel 5 has mounted thereon a film advancing sprocket 6 which advances the film 7 upwardly on its left side under fixed roller 9 and adjustable pad roller 10, and downwardly on the right side of the sprocket under fixed roller 11 and adjustable pad roller 12. The film above the sprocket is threaded through a film apparatus such as a sound film reproducer or recorder, not shown. The film is being supplied from a film roll or reel 14 on a free wheeling hub 15 held on its shaft by a key 16, and is taken up on the roll or reel 18 on a free wheeling hub 19 held on its shaft by a key 20. A drive roller 22 bears against the roll 14 and is rotated by the pull of the film by the sprocket 6. A similar roller 23 bears against the roll 18 and is driven by the roller 22. Since the rollers 22 and 23 are on arms pivoted at the point 24, their mounting shafts will follow a groove 25 in the panel 5, as will now be explained.

Figure 2:
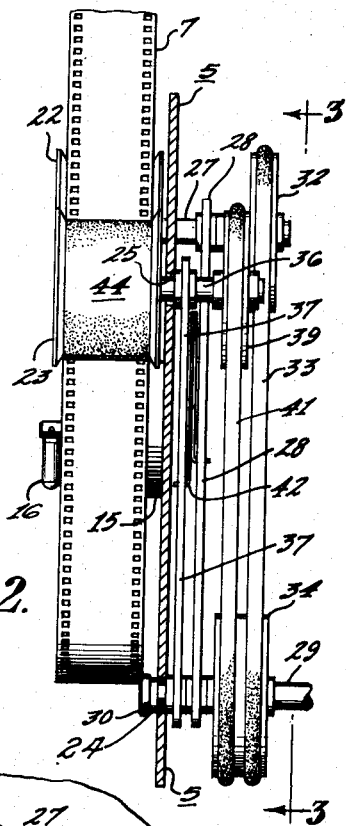
Fig. 2 is a cross-sectional view of the film drive mechanism of Fig. 1, taken along the line 2—2 of Fig. 1.
Figure 3:
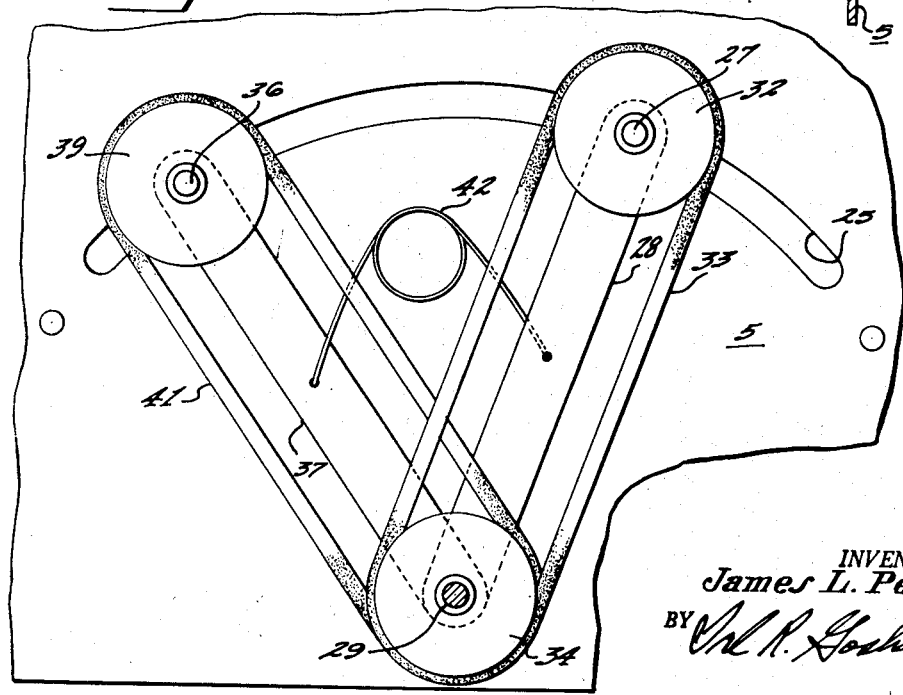
Fig. 3 is a rear, elevational view, taken along the line 3—3 of Fig. 2.

Referring now to Figs. 2 and 3, the roller 22 is on a shaft 27 which is mounted in the end of an arm 28, the other end of which is pivoted on a shaft 29 having one end 30 fastened in the panel 5. The other end of the shaft 27 has a grooved pulley 32 fixed thereon, around which is a belt 33 extending to one groove of a pulley 34 rotatable on the shaft 29.

The roller 23 is mounted on the shaft 36, which is supported at one end of an arm 37, the other end of which is pivoted on the shaft 29. The point 24 in Fig. 1 is on the axis of shaft 29. The other end of the shaft 36 has a grooved pulley 39 fixedly mounted thereon, in the groove of which is a belt 41 which extends around a second groove in the pulley 34 on the shaft 29. Thus, rotation of the roller 22 will drive through the pulleys 32, 34, and 39, and the belts 33 and 41, the roller 23. A U-shaped spring 42 places a tension on the arms 28 and 37 to tend to separate them and cause pressure of the rollers 22 and 23 on the respective rolls 14 and 18. The rollers 22 and 23 have beveled flanges to guide the film on the rolls. They also are rubber tired, as shown at 44, in order to provide better traction between the rollers and the film and reduce slippage of the film on the rollers to a minimum.

The above device eliminates the use of an auxiliary takeup drive motor or motors or drive mechanisms deriving their power from the drive for the sprocket 6. Thus, the use of slipping clutches is eliminated. The diameters of the pulleys are such that an overdrive of approximately ten percent is provided to compensate for film slippage, belt slippage, and friction losses as mentioned above. This also provides a constant tension on the film between the takeup spool 18 and film sprocket 6. The amount of power required to drive the above described mechanism is negligible when measured at the film driving sprocket. The load of the takeup film roller 23 provides a convenient drag or holdback on the sprocket 6, which is designed to also maintain a desired tension between the roller 22 and the sprocket 6. The drive mechanism thus causes the film to wind tightly on roll 18. Some of this tension is derived from the overdrive of the roller 23, and additional tension is derived from the tension of this roller against the film takeup spool which causes a slight change in the radius of the point of contact with the spool to provide additional overdrive. As the rolls 14 and 18 vary in diameter, the arms 28 and 37 adjust the rollers 22 and 23, roller 22 being driven at the linear speed of the film 7.

The direction of rotation of the takeup roll 18 may be reversed by crossing one of the belts 33 or 41, while a single belt may be used if pulley 34 is divided into two independent pulleys. In this case, the single belt would be threaded over each pulley 32 and 39 and under each of the pulleys at the position of pulley 34. A single belt arrangement would tend to reduce frictional losses.

I claim:

1. A drive for a film take-up reel, comprising a film take-up spool on which a film is to be wound, a film supply spool on which film has been wound, and which is to be supplied to said take-up spool, a roller in contact with the film on said take-up spool, a roller in contact with the film on said supply spool, interconnecting means between said rollers for driving one of said rollers from the other of said rollers, said interconnecting means including a first arm fixedly pivoted on a certain axis at one end between said spools and having a pulley at the other end, a second arm fixedly pivoted on the same axis as said first arm and having a second pulley at the other end, a grooved pulley rotatable on a shaft on said axis, belt means between said rollers and said grooved pulley, and resilient means interconnecting said arms for urging said rollers toward said spools.

2. A power transfer system for film take-up reels, comprising a supply reel having a film thereon, a roller in contact with the film on said reel and rotated by the advancement of film therefrom, a take-up reel on which said film is to be wound, a roller in contact with the film on said take-up reel, means for exerting pressure of said rollers on said film on said respective reels, and means for transferring power to rotate said roller on said film on said take-up reel from the rotation of said roller on said film on said supply reel, said last mentioned means including a pair of arms having one end of each arm pivoted on a common axis between said reels, one of said rollers being mounted for rotation on the other end of each of said arms, a pulley connected to each of said rollers, a pulley on said common axis, and belt means between said roller pulleys and said pulley on said common axis, said pressure exerting means being a spring for urging said arms apart, the position of said common axis varying the radius of the point of contact of said roller with the film on said take-up reel to provide overdrive to said reel.

3. A power transfer system for film being supplied by one reel to a takeup reel comprising a free wheeling reel having film thereon, a second free wheeling reel having a few turns of said film thereon, and a roller bearing on one surface of the last turn of the film on each reel, and means for transferring the energy of said film being pulled from one reel to wind up the film on said second reel, said roller and energy transfer means including a pair of arms having one end of each arm pivoted on a common axis, a drive pulley for each of said rollers, each pulley being mounted on the other end of each of said arms, a pulley on said axis, drive means interconnecting all of said pulleys, and means for permitting movement of said arms and exerting pressure between said rollers and film as the diameters of the rolls of film on said reels vary.

4. A drive for a film take-up reel in accordance with claim 1, in which the size of said pulleys are such that the linear velocity of the surface of said roller in contact with film on said take-up spool is greater than the linear velocity of the surface of the roller in contact with film on said supply spool.

JAMES L. PETTUS.

References Cited in the file of this patent

UNITED STATES PATENTS

| Number | Name | Date |
|---|---|---|
| 1,414,941 | Gill | May 2, 1922 |
| 1,563,382 | Legg | Dec. 1, 1925 |
| 2,140,557 | Schwarz | Dec. 20, 1938 |
| 2,374,038 | Ress | Apr. 17, 1945 |

FOREIGN PATENTS

| Number | Country | Date |
|---|---|---|
| 419,809 | Great Britain | Aug. 18, 1933 |